United States Patent [19]

Wood et al.

[11] Patent Number: 4,651,129

[45] Date of Patent: Mar. 17, 1987

[54] MOTOR VEHICLE REAR LIGHT ASSEMBLY

[75] Inventors: P. John Wood, Solana Beach; Richard A. Gray, San Diego, both of Calif.

[73] Assignee: Bac-Off Corporation, San Diego, Calif.

[21] Appl. No.: 730,354

[22] Filed: May 3, 1985

[51] Int. Cl.⁴ .............................................. B60Q 1/26
[52] U.S. Cl. ........................................ 340/72; 340/71; 340/81 R; 340/83
[58] Field of Search ................. 340/72, 71, 66, 67, 340/83, 87, 82, 97, 81 R; 315/200 A

[56] References Cited

U.S. PATENT DOCUMENTS

| | | | |
|---|---|---|---|
| 2,300,896 | 11/1942 | Hosmer | 177/327 |
| 3,109,158 | 10/1963 | Coombs | 340/66 |
| 3,305,829 | 2/1967 | Knez | 340/72 |
| 3,375,496 | 3/1968 | Antunovic | 340/72 |
| 3,441,906 | 4/1969 | Nielsen | 340/72 |
| 3,460,089 | 8/1969 | Gregory | 340/67 |
| 3,501,742 | 3/1970 | Ellison | 340/71 |
| 3,568,146 | 3/1971 | Knez | 340/72 |
| 3,629,820 | 12/1971 | Sakurai | 340/72 |
| 3,656,104 | 4/1972 | Samra | 340/97 |
| 3,676,844 | 7/1972 | Hendrickson | 340/71 |
| 3,693,151 | 9/1972 | Hasegawa et al. | 340/72 |
| 3,914,739 | 10/1975 | Caughlin et al. | 340/72 |
| 4,403,210 | 9/1983 | Sullivan | 340/72 |

FOREIGN PATENT DOCUMENTS 2812178  9/1979  Fed. Rep. of Germany ........ 340/72

*Primary Examiner*—Donnie L. Crosland
*Attorney, Agent, or Firm*—Brown, Martin, Haller & Meador

[57] ABSTRACT

A motor vehicle rear light assembly designed to be used in addition to the conventional vehicle brake lights includes a housing adapted to be mounted at the rear of a vehicle and having at least three compartments each containing a light source such as one or more light bulbs. The light sources are operated by a suitable control circuit, which may be connected to the vehicle brake lighting system, so that the central light source is switched on to burn continuously as long as the brakes are applied and the outer two light sources flash alternately on and off a predetermined number of times as soon as the brakes are applied and then burn continuously until the brakes are released. Mounting brackets which are rotatably mounted on the housing are used to mount the housing on a vehicle in the desired orientation.

14 Claims, 9 Drawing Figures

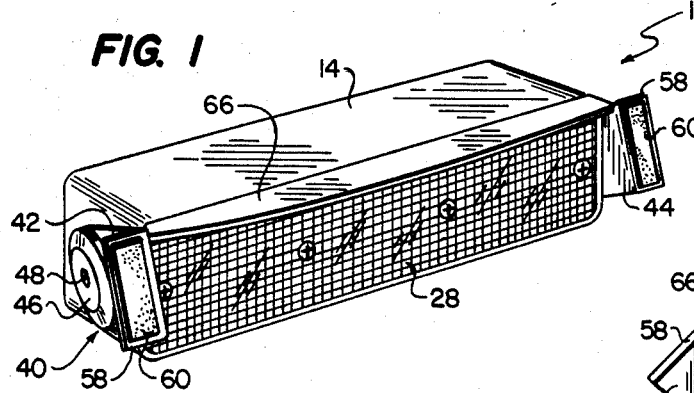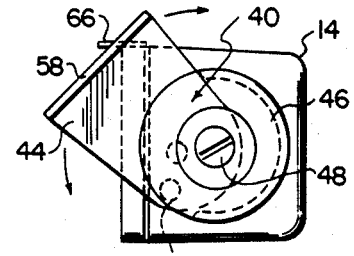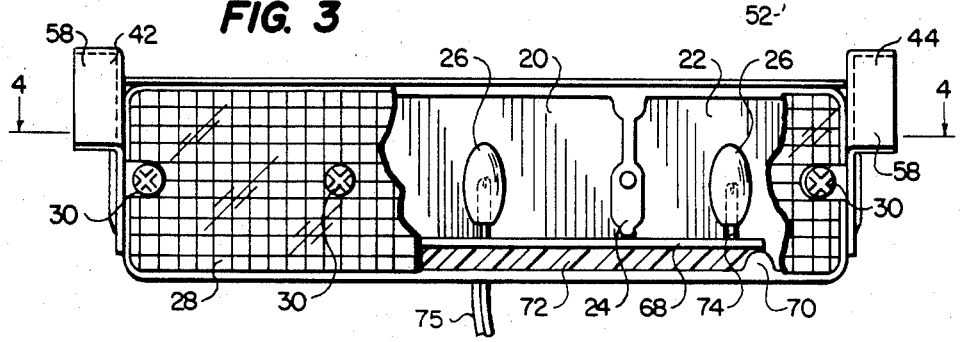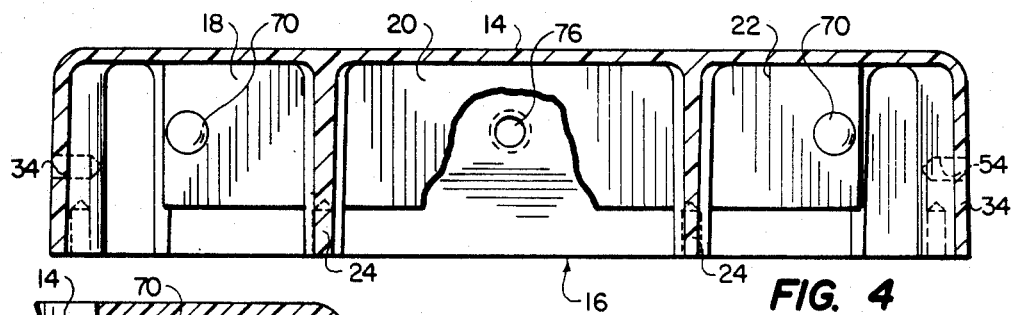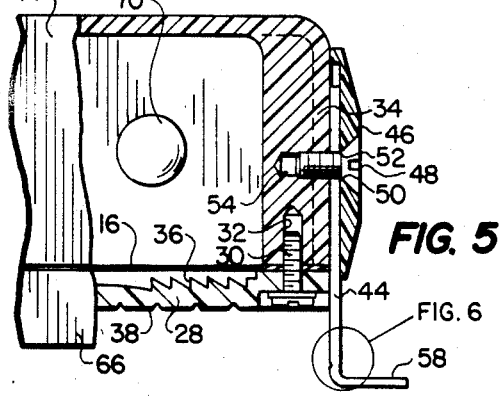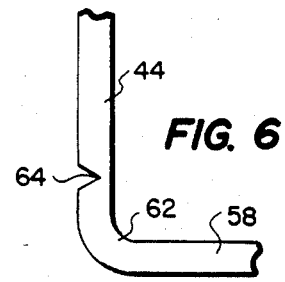

MOTOR VEHICLE REAR LIGHT ASSEMBLY

BACKGROUND OF THE INVENTION

The present invention relates to a rear light assembly for signalling braking of a motor vehicle such as a car, truck or motor cycle. It specifically relates to an auxiliary rear light assembly to be used in addition to the standard vehicle brake lights.

The standard motor vehicle rear brake lights comprise conventional tail lights mounted low down on the rear of the vehicle. When the motor vehicle lights are on, braking simply results in a steady light of greater intensity, which may or may not be noticed by the following drivers. Tail lights are normally positioned on the right and left hand lower edges of vehicles and are thus in a driver's peripheral vision. It is quite possible for a driver not to notice brake lights in vehicles ahead, and in fact rear end collisions as a result of drivers not noticing the brake light signal are relatively common, particularly in bad weather, poor visibility conditions There is therefore some need for an improved brake signal indicating device which will alert following drivers but at the same time will not unduly distract them from observation of other traffic conditions. Various signalling devices have been proposed in the past for providing a more obvious braking or deceleration signal to following drivers.

Some of the previous signalling devices use existing tail light assemblies, which are normally at a low level well below the line of sight of following drivers and limited to their peripheral vision. These therefore have much the same visibility problems as standard brake lights. These systems generally provide electrical circuits to cause the brake lights to flash on and off for a predetermined time, since a flashing light is more noticeable than a steady one. The lights then burn steadily as long as the brakes are applied. For example, in U.S. Pat. No. 3,441,906 of Nielson each tail light includes two lamps directed at different angles which are caused to flash alternately by application of the brakes.

In U.S. Pat. No. 4,403,210 of Sullivan, an enhancer circuit is inserted in a conventional vehicle lighting system to cause the brake lights to flash on and off a predetermined number of times. Similar devices are described in U.S. Pat. No. 3,629,820 of Sakurai, U.S. Pat. No. 3,693,151 of Hasegawa et al, and U.S. Pat. Nos. 3,305,829 and 3,568,146 of Knez.

It has been proposed to provide an extra brake or signal light assembly in addition to the conventional vehicle rear lights. Thus, in U.S. Pat. No. 3,109,158 of Coombs a three lamp signal light assembly is mounted on the rear of a vehicle body in a central position. Different combinations of the three lamps are arranged to light up in response to idling, acceleration, braking, and reverse motion of the vehicle. However, this would require following drivers to be able to interpret the lamp combinations correctly, and could distract them unduly from their own driving. In U.S. Pat. No. 3,375,496 of Antunovic a deceleration indicator for motor vehicles is described in which three light bulbs are mounted in a housing on the rear of a vehicle. In response to deceleration of the vehicle as a result of release of the accelerator the central bulb burns steadily while the outer bulbs flash on and off.

SUMMARY OF THE INVENTION

It is an object of the present invention to provide a motor vehicle rear light assembly which provides an improved and more obvious warning signal to following vehicles when the brakes are applied.

According to one aspect of the present invention, a motor vehicle rear light assembly is provided which comprises a housing for mounting at the rear of a vehicle, the housing having at least two compartments, and two light sources such as lamps or light bulbs mounted in the housing compartments.

A central circuit is provided to control the switching of the lamps on and off. In a preferred arrangement, a central compartment and lamp is provided to be switched on when the brakes are applied and to burn continuously as long as pressure is applied to the brakes, while the outer two lamps are arranged to switch on and off alternately for a predetermined number of times as soon as the brakes are applied, and then to burn continuously as long as the brakes are applied. In a preferred arrangement, the outer lamps flash on and off alternately four times each, for a total period of about 1½ to 4 seconds, and then continue to burn steadily until the brakes are released. The housing compartments may each contain more than one light bulb or lamp, if desired.

In a preferred arrangement, the control circuit is provided on a printed circuit board mounted in the base of the housing with suitable contact sockets in the board for receiving the lamps or light bulbs. The circuit board may be wired into any brake light circuit of the vehicle when the assembly is installed. A high thermal conductivity mounting is provided to allow heat to be conducted away from the lamps to the housing body and dissipated when the brakes are applied for a fairly long period of time.

According to another aspect of the present invention, a motor vehicle rear light assembly is provided which comprises a housing having at least three compartments, a light producing assembly such as one or more light bulbs being mounted in each of the compartments, and a mounting assembly for mounting the assembly centrally either inside or outside the rear window of a vehicle.

The mounting assembly comprises a pair of mounting brackets, one at each end of the housing, which are rotatably mounted on the housing. Each bracket includes some means for securing it to the rear window or other surface of a vehicle. The brackets are rotated relative to the housing until the lights are directed correctly. The brackets are then secured against rotation and attached to the desired vehicle surface, by adhesive or by screws, for example.

In a preferred embodiment of the invention, the housing is intended to be mounted inside the rear window of an automobile, so that it does not interfere with the smooth lines of the vehicle. The mounting brackets each comprise substantially L-plate members rotatably mounted at one end at opposite ends of the housing and having a turned out rim or foot at their free ends so that the plate members are of substantially L-shaped cross-section. The plate members may be inverted so that the feet face toward or away from one another. The feet are adapted to be secured to a convenient surface of the vehicle, such as the inner or outer surface of the window. Preferably a suitable securing means, such as an adhesive strip, is applied to the outer face of each foot.

Since automobile window surfaces are normally curved, the feet of the L-shaped plate members which secure to the window are preferably each bendable relative to the rest of the plate member, so that they can be bent to conform more exactly to the shape of the window.

A hood member of resilient material is mounted at the upper forward edge of the housing so as to cover the gap between the housing and the window when the mounting brackets are secured, and to minimize distracting back reflections of light from the window which would otherwise interfere with the driver's correct mirror vision.

The mounting assembly may alternatively be designed for mounting the rear light assembly on the rear of a motorcycle to improve visibility of the motorcycles and thus reduce the risk of following vehicles colliding with it. The mounting assembly may be designed to allow mounting above or below the license plate, on the luggage compartment or on the finder or seat back.

The vehicle rear light assembly of the invention will therefore make brake actuation and resultant slowing of a vehicle more visible to following driver's allowing them more time to react and thus reducing the risk of rear end collisions.

BRIEF DESCRIPTION OF THE DRAWINGS

The above and other objects and advantages of the present invention will become more clear from the following detailed description of a preferred embodiment of the invention, taken in conjunction with the accompanying drawings in which like reference numerals refer to like parts and in which:

FIG. 1 is a perspective view showing a motor vehicle rear light assembly according to a preferred embodiment of the present invention;

FIG. 2 is a side elevational view of the assembly;

FIG. 3 is a front elevational view, partly broken away to reveal the interior of the assembly housing;

FIG. 4 is a sectional view of the housing on the lines 4—4 of FIG. 3, with the lens and end caps removed;

FIG. 5 is an enlarged view similar to FIG. 4 showing an end portion of the housing with a mounting bracket and end cap;

FIG. 6 is an enlarged view of part of a mounting bracket;

DETAILED DESCRIPTION OF THE DRAWINGS

Figure 7:
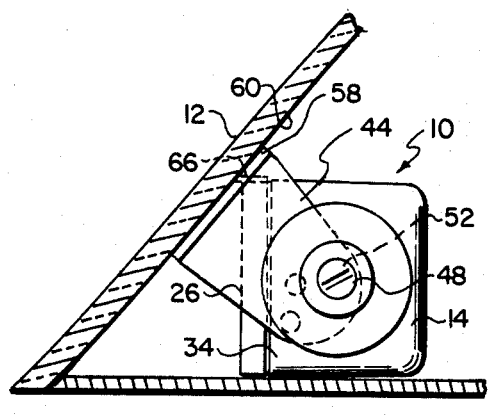
FIG. 7 is a side elevational view showing the assembly mounted inside the rear window of a motor vehicle.

The drawings show a motor vehicle rear light assembly 10 according to one embodiment of the present invention which is designed to be mounted inside or outside the rear window 12 of a motor vehicle. The assembly 10 is preferably mounted by the user at the bottom center inside the rear window of the vehicle as shown in FIG. 7, but it may alternatively be mounted outside on the rear window or on the trunk or hatch lid.

Although the vehicle rear light assembly is described below as mounted on a automobile, in alternative embodiment, it may also be designed for mounting on the rear of other motor vehicles such as trucks, mobile homes, motorcycles, and so on, with little or no modification to the mounting assembly.

As best shown in FIGS. 1 to 4, the assembly 10 basically comprises a housing 14 having an open front face 16 and three separate compartments 18, 20 and 22 separated by dividing walls 24 within the compartments.

As shown in FIG. 3 a light source, such as one or more light bulbs 26, is mounted in each of the compartments. A cover lens 28 of a suitable unbreakable material is secured across the open face 16 of the housing by means of spaced screws 30 which engage in screw threaded bores 32 in the housing end walls 34 and dividing walls 24. A gasket is preferably fitted between the lens and the opposing outer ends of the walls 34 and 24.

The light bulbs may preferably be 100% halogen cycle bulbs, for example, and the cover lens is of a suitable warning color such as red. Halogen bulbs are sufficiently small to be vertically mounted to thereby cast a horizontal beam. The lens is preferably of unbreakable plastic such as Lexan (Registered Trademark). The lens is manufactured with any suitable optical surfaces. In the preferred embodiment illustrated the inner surface 36 is catadioptric (i.e. causing both reflection and refraction of light) and the outer surface 38 is pillow optic, as indicated in FIG. 5.

A mounting assembly 40 is provided for mounting the housing 14 on the rear of a motor vehicle. In the preferred embodiment of the invention the mounting assembly comprises a pair of end brackets 42, 44 rotatably mounted at opposite ends of the housing. Each bracket is mounted between the respective end wall and an end cap 46. The end cap and bracket at each end are secured by means of an end screw 48 which passes through aligned holes 50 and 52 in the end cap and bracket, and into a screw threaded bore 54 in the respective end wall 34.

Figure 8:
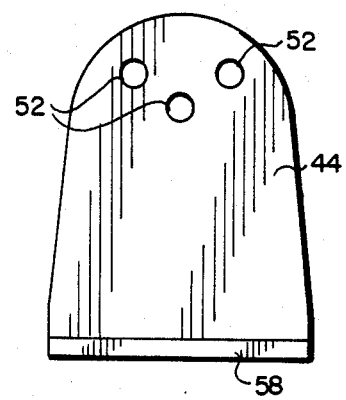
FIG. 8 is front elevational view of one of the mounting brackets of the assembly.

Each end bracket comprises a plate member having a series of mounting holes 52 adjacent one end for mounting it on the end wall of the housing, and a bent or turned out rim or foot 58 at its opposite end so that the plate member has a substantially L-shaped cross-section (see FIG. 5). The arrangement of the mounting holes 52 can be seen most clearly in FIG. 8, and the provision of more than one mounting hole allows for more possible positions of the bracket relative to the housing. More or less than three mounting holes may be provided if desired, and the holes may be positioned differently. The outer, rim or foot 58 of the L-shaped plate member is designed to be secured to a chosen surface of the motor vehicle, such as the inner or outer surface of the rear window 12, or another convenient surface. In the embodiment shown in the drawings, the outer face of the foot 58 has an adhesive pad or strip 60 secured to it. The foot 58 may also have a screw hole (not shown) for screw attachment to rough or irregular surfaces to which the adhesive will not bond.

Each of the brackets 42 and 44 is preferably scored along its outer face adjacent bend 62 to form groove 64 (see FIG. 6). This allows feet 58 to be bent more easily relative to the rest of the bracket so that they can be conformed more exactly to the shape of the surface to which they are to be secured. The brackets are preferably of metal which is in a relatively soft condition so that it will not tend to fracture on bending.

When the housing is to be secured to the inside of an automobile rear window, for example, the end screws 48 are first loosened to allow the brackets 42 and 44 to be rotated. Since the mounting brackets can rotate through 360° and can be secured to the housing by any one of the number of mounting holes 52, the housing can be mounted easily at virtually any angle.

When the brackets are in the desired orientation for fitting the housing up against the rear window 12 as shown in FIG. 7, the end screws 48 are tightened and the adhesive pads are secured to the window surface. If necessary, the adhesive feet 58 may be bent relative to legs 56 so that they conform more exactly to the curve of the window or other surface to which they are to be attached. The legs or feet 58 need not be flat as shown, and they are designed to conform to the average curve of most automobile rear windows. Once the brackets have been secured to the window, the housing orientation can be easily readjusted if necessary by release and re-tightening of the end screws 48.

When the housing has been secured to the rear window 12 as shown in FIG. 7, a window reflection shield 66 which is adhesively secured to the upper front edge of the housing will project forwardly to engage the opposing face of the window. The shield 66 is of suitable resilient material such as rubber and has a curved front edge (see FIG. 1) which is designed to conform to the average curve of most automobile rear windows. Thus, the housing can be easily mounted inside a rear window 12 by positioning it so that shield 66 is pushed against the window surface, then rotating the brackets until they contact the window surface. They are then secured in place.

Figure 9:
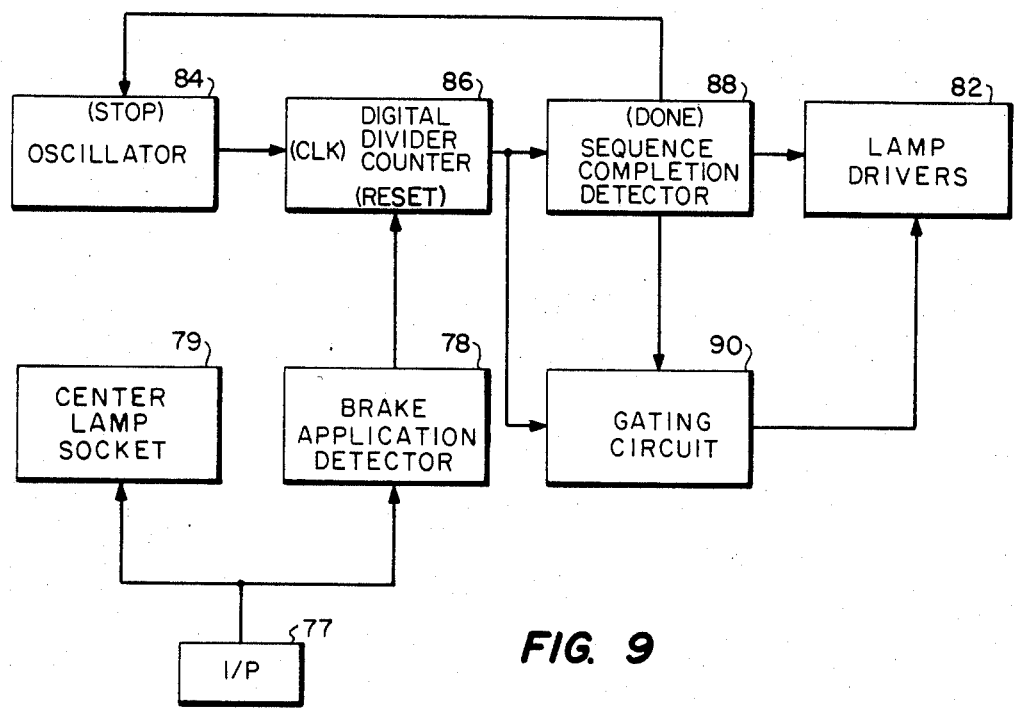
FIG. 9 is a block diagram of the control circuit for operating the light assembly.

The operation of the light sources in the assembly 10 is controlled by a control circuit which is arranged in the preferred embodiment of the invention to turn the control light of the assembly on to burn continuously when the brakes are applied until they are released, and to cause the outer lights to flash alternately on and off. FIG. 9 illustrates the one possible control circuit for performing this function, although it will be understood by these skilled in the field that various alternatives are possible.

The control circuit is suitably provided in a circuit board 68 mounted in the base of the housing so as to rest against contact projections 70. The board 68 is preferably secured by adhesive 72 such as an epoxy. The circuit board 68 is provided with suitably positioned light bulb contacts or sockets 74 for mounting the light bulbs 26 in each of the compartments. The sockets are preferably positioned so that each light is located substantially in the center of its respective compartment. Connecting input wires for the circuit pass out of an opening 76 in the base of the housing (see FIG. 4) for connection to the vehicle electrical system, as described in more detail below.

The operation of the light assembly 10 will now be described in more detail with reference to FIG. 9. The connecting wires 75 to the control circuit input 77 may be wired to the vehicle brake light switch or into any of the brake light circuits in the vehicle trunk in a known manner so that the assembly operates in conjunction with the main brake lights of the vehicle. If the vehicle is of the type in which both the turn signal and the braking signal are provided in the same light control circuit must be wired to the brake light switch. Where the brake and turn lights are separate, the circuit can be wired to any of the brake light circuits. Alternatively, the circuit can be wired through a logic element to detect when both brake lamps are not illuminated (as in turn signal use.)

The center lamp socket 79 is connected directly to the circuit input 77, which is suitably connected to either the vehicle brake light switch or any of the brake light circuits, as discussed above, when the assembly is installed on a vehicle. Thus the center light of the assembly acts in exactly the same way as the standard vehicle brake lights and will be on continuously as long as they are on.

The input 77 is also connected to a power or brake application detector 78, which may, for example, comprise an RC differentiator. The detector 78 is connected to reset input of a binary digital divider counter 86. A clock input of counter 86 is connected to oscillator 84, and the counter output is connected to a sequence completion detector 88 and to a gating circuit 90. The gating circuit 90 is connected to outer lamp drivers 82, and is arranged such that, during the flashing sequence, one of the outer lamps is on while the other is off, and vice versa. The sequence completion detector is also connected to the outer lamp drivers and to the oscillator, as indicated in FIG. 9.

The operation of the control circuit will now be described in more detail. When brake power is detected, the brake application detector 78 provides a reset signal to the counter which resets it to zero to start the counting sequence. During the counting sequence, the counter produces an alternating binary output signal to flash the outer two lamps on and off alternately via the gating circuit.

The sequence completion detector detects when the counter reaches a particular number, chosen according to how many times the outer lights are to flash. When this number is reached, the detector produces an output control signal to stop the counter and gate both outer lamp drivers to be on continuously for as long as the brakes continue to be applied.

In the preferred embodiment of the invention, the control circuit is arranged to cause the light bulbs in the outer two compartments to flash on and off alternately a total number of four times each during a time period of about 1½ to 4 seconds, although other flashing sequences may be used if desired.

Although in the preferred embodiment of the invention described above the housing has three compartments for containing light sources, it may be provided with more lighting compartments in alternative embodiments, with the light bulbs or lamps in the extra compartments controlled to flash or burn continuously or to do both in sequence in response to application of the brakes. Reflectors may be mounted in the housing rear wall behind each of the light bulbs to enhance the light intensity The control circuit is preferably provided in a circuit board mounted within the housing, but may alternatively be designed for mounting on any interior surface of a vehicle, for example inside the luggage or other compartment. The housing may be of die-cast metal such as aluminum which is preferably anodized in a suitably neutral color such as dark grey to blend in with vehicle trim items. The outer surface of the housing is preferably roughened by sand blasting to increase heat radiation from the housing and help to prevent overheating. The roughening of the housing and walls also helps to lock the end brackets when they are secured the position by providing a roughened bearing surface for the brackets.

Since the circuit board is in contact with the high thermal conductivity material of the housing via contact projections 70, heat can be conducted away from the interior of the housing to be dissipated into the air. This is particularly importantly in situations where the brakes are applied for a lengthy period to time, when the heat from the light bulbs 26 may otherwise cause overheating and damage to the circuit components.

When the housing is mounted inside the rear of a vehicle window, the hood or shield 66 will minimize back reflections from the lights which may otherwise distract a driver of the vehicle.

The rear light assembly of this invention is designed in most cases to be mounted relatively high on the rear of a vehicle and in a central position, where it will be in the direct line of sight of most following drivers. The alternate flashing of the outer two lights will also tend to catch the eye of following drivers. It has been found that flashing lights are more noticeable than a steady light, and thus as soon as the brakes are applied the auxiliary light assembly will tend to attract the attention of any following drivers, normally given them more time to react and thus reducing the risk of rear end collisions. This is particularly important in bad weather or other poor visibility conditions, where application of the conventional rear brake lights is even more likely to be missed by following drivers particularly at night where brake application simply causes the standard tail lights to burn more brightly. This can easily be overlooked, particularly since there is a wide range of normal brightness in such tail lights.

The mounting assembly for the light housing is versatile and allows the housing to be mounted on any convenient surface of the vehicle. The mounting brackets allow the orientation of the housing to be adjusted after mounting for precise control of the direction in which the lights project. The brackets may be rotated to point out as in the illustrated installation or rotated to turn it for installation on the exterior of a vehicle.

In the preferred embodiment, the mounting brackets are designed to allow mounting either inside or outside the vehicle window.

In an alternative embodiment, the housing may be provided with a mounting bracket or brackets for securing it to a convenient surface or member at the rear of a motorcycle. Such a warning light assembly would be a particularly useful safety device for motorcycles, which are often overlooked by larger vehicles on the road and are thus under a greater risk of rear end collisions. The motorcycle mounting bracket can be designed for mounting the housing above or below the license plate, on the high luggage compartment, or on the finder or seat back, for example.

Thus the rear light assembly of this invention, can be installed relatively easily on any motor vehicle, can be adjusted easily to be mounted at virtually any angle so that any convenient mounting surface can be used and the light direction can be adjusted to point directly rearward. The light assembly operates to provide an additional and eye-catching warning to following drivers when the vehicle's brakes are applied.

Although a preferred embodiment of the invention has been described above by way of example, it will be understood by those skilled in the field that modifications may be made to the disclosed embodiments which are within the scope of the invention as defined by the appended claims.

We claim:

1. A motor vehicle rear light assembly comprising:
a housing having at least two compartments;
at least one light bulb mounted in each of the compartments;
mounting means for mounting the housing at the rear of the vehicle so that the compartments face rearwardly; and
control means for controlling operation of the light bulbs in a predetermined sequence in response to application of the brakes of a vehicle, the control means comprising a control circuit provided on a circuit board mounted in the housing, the circuit board having contact sockets for receiving the light bulbs and connecting them in the circuit, the control circuit including flash control means for controlling the two light bulbs to flash on and off alternately a predetermined number of times after application of the brakes, counter means for counting the total number of times each light bulb flashes on and off, and means responsive to said counter means reaching said predetermined number for switching the light bulbs on to burn continuously for as long as the brakes continue to be applied.

2. The assembly of claim 1 where said housing has at least three compartments and said control means further comprises means for operating the light source in the central compartment to be on continuously during an application of the brakes.

3. The assembly of claim 2, wherein said flash sequence control means comprises means for flashing the light sources in the outer compartments on and off alternately a total number of four times after each application of the brakes.

4. The assembly of claim 3, wherein said flash sequence control means flashes said light sources on and off repeatedly for a total time period of between 1½ and 4 seconds after each application of the brakes.

5. The assembly of claim 1, wherein said mounting means comprises a mounting assembly rotatably mounted on the housing and having means for securing said mounting assembly to a surface of a motor vehicle.

6. The assembly of claim 5, wherein said mounting assembly comprises a pair of mounting brackets rotatably mounted at opposite ends of the housing, means for securing said brackets in a selected orientation relative to the housing, and adhesive means on said brackets for securing said brackets to a vehicle surface.

7. The assembly of claim 6, wherein each bracket comprises a plate member having one end rotatably mounted on a respective end of the housing and a foot at its free end, said adhesive means being provided an outwardly facing surface of said foot.

8. The assembly of claim 7, wherein said foot is bendable relative to the rest of said plate member to allow it to be adjusted to lie substantially flat against a vehicle surface.

9. The assembly of claim 7, wherein said adhesive means comprise means for securing said bracket to an inner face of a vehicle rear window, each foot comprising a bent end portion of a bracket having a groove in the area of the bend for allowing the foot to be bent relative to the rest of the bracket.

10. The assembly of claim 2, wherein said control means includes connecting means for connection to a motor vehicle brake light circuit, said connecting means being connected directly to said light source in said central compartment, and to said flash sequence control means.

11. The light assembly of claim 1, including a window reflection shield mounted at the upper front edge of the housing to project forwardly of the housing for engagement with an opposing surface of a vehicle rear window inside which the housing is mounted.

12. A motor vehicle rear light assembly, comprising:
a housing having at least three compartments comprising a central compartment and two outer compartments;
at least one light bulb mounted in each of the compartments; and
control means for controlling operation of the light bulbs, comprising means for switching the bulb in the central compartment on to burn continuously during an application of the brakes, and flash control means for controlling the two outer bulbs to flash on and off alternately a predetermined number of times after each application of the brakes, and subsequently to switch the two outer bulbs on continuously for as long as the brakes continue to be applied.

13. The assembly according to claim 12, wherein said control means comprises a printed circuit board mounted in the housing and having a control circuit mounted on it for controlling operation of the light bulbs, the circuit board having integral light bulb sockets for receiving the three light bulbs and connecting them in the control circuit.

14. The assembly according to claim 12, wherein the flash sequence control means comprises a counter having a pulsed output and means for actuating the counter in response to application of the brakes, gate means for connecting the pulsed output of the counter to the outer two light bulbs such that they are alternately flashed on and off, means for detecting when the counter reaches a predetermined number, and for stopping the counter to turn the two light bulbs on continuously when the predetermined number is reached for as long as the brakes continue to be applied.

* * * * *